United States Patent Office 3,140,938
Patented July 14, 1964

3,140,938
LIQUID SOIL CONDITIONER AND THE METHOD FOR APPLYING SAID COMPOSITION TO THE SOIL
Jesse E. Martin, P.O. Box 1016, Eagle Pass, Tex., and Arthur T. Fergurson, 152 Thomas Jefferson St., San Antonio, Tex.
No Drawing. Filed Oct. 31, 1962, Ser. No. 234,517
4 Claims. (Cl. 71—1)

This invention relates to a soil conditioner. More particularly, it relates to a composition of ingredients to be applied, in liquid form, to the soil which will improve the water-penetration, water-absorption, and water-retention properties of the soil.

It has long been known that organic matter, such as humus, in soil helps the soil to absorb and retain moistuer and improves the ability of the soil surface to be penetrated by water. More recently there have become available synthetic polymeric materials which, when applied to soil, improve the water penetration properties and other characteristics of the soil by altering the soil's structure. This involves the agglomeration of the finer silt and clay particles into larger, more porous aggregates. Often there is caking or crusting at the surface of the soil when such materials are employed. Moreover, these polymers are relatively expensive, and this factor has, in some instances, discouraged widespread use of such materials.

It is the primary object of the present invention to provide a novel soil conditioning composition which, when applied to the soil, improves the water penetration, absorption, and retention properties thereof.

A further object of the present invention is to provide a novel soil conditioning composition which, when applied to the soil, promotes nutrient activity therein.

Another object of this invention is to provide a relatively inexpensive novel soil conditioning composition which can easily be applied to the soil.

Additional objects of this invention will become apparent from a consideration of the following specification and claims.

In accordance with the present invention, a soil conditioner comprising a mixture of a water soluble non-ionic surface active agent, petroleum ether, sodium bicarbonate, hydrochloric acid, potassium permanganate, crude oil and water, has been found to increase the ability of the soil to absorb and retain moisture.

It has been found that the application of a non-ionic surface active agent to soil, either in the form of an aqueous solution or in dry, finely-divided form which will subsequently become dissolved in the soil moisture or moisture applied to the soil, markedly increases the ability of the so-treated soil to absorb and retain moisture and to be penetrated by rain or other applied moisture. Soils which force rain or other applied moisture to run off before sufficient penetration can easily be converted into a soil which is penetrated by rain and other applied moisture. Consequently, this moisture will be available to the underlying soil for absorption and will be retained longer than where the soil is untreated.

As stated, in accordance with the present invention, a non-ionic surface active agent is incorporated into the soil conditioning composition which is applied to the soil to be treated. Non-ionic surface active agents are molecules made up of hydrophilic and hydrophobic components. In such surface active agents, hydroxyl groups and ether linkages are chiefly depended upon to provide the hydrophilic action. Non-ionic surface active agents do not ionize and it is because of this that they are comparatively insensitive to electrolytes. The agents employed in accordance with the present invention will, of course, at least have some significant solubility in water. Examples of such materials are Oronite dispersants, the alkyl aryl polyether alcohols, including the polyethylene glycol ethers of alkylated phenols, the polyethylene glycol esters of rosin, and the corresponding higher polyalkylene glycol derivatives, such as the polypropylene glycol derivatives; the partial esters of fatty acids and hexitol anhydride, such as sorbitan monolaurate, sorbitan monooleate, sorbitan trioleate, and the like; the polyoxyethylene addends of the partial esters of fatty acids and hexitol anhydride, such as polyoxyethylene sorbitan monolaurate, polyoxyethylene sorbitan monopalmitate, polyoxyethylene sorbitan monostearate, polyoxyethylene sorbitan monooleate, and the like, the ethylene oxide addends of fatty acids, such as polyoxyethylene stearate, and the like; polyoxyethylene lauryl alcohol and the like.

The petroleum ether is incorporated into the present composition for the purpose of effectively retaining the sodium bicarbonate, the potassium permanganate, the hydrochloric acid and the water in solution.

The synergistic composition herein presented creates an embryonic action when applied to the soil, propagates nutrient environment activities therein, and accordingly, is highly advantageous for utilization in conjunction with soil conditioning efforts.

Compositions useful in the practice of the present invention as soil conditioners are described in the following examples. These examples are given by way of illustration and not as a limitation of this invention.

Example 1

| | Oz. |
|---|---|
| Oronite dispersant | 400 |
| Petroleum ether | 400 |
| Sodium bicarbonate | 275 |
| Hydrochloric acid | 15 |
| Crude oil | 10 |
| Potassium permanganate | .35 |
| Water | 18,000 |

Example 2

| | |
|---|---|
| Oronite dispersant | 400 |
| Petroleum ether | 300 |
| Sodium bicarbonate | 300 |
| Hydrochloric acid | 15 |
| Crude oil | 10 |
| Potassium permanganate | .25 |
| Water | 14,000 |

Example 3

| | |
|---|---|
| Oronite dispersant | 300 |
| Petroleum ether | 350 |
| Sodium bicarbonate | 350 |
| Hydrochloric acid | 20 |
| Crude oil | 5 |
| Potassium permanganate | .2 |
| Water | 16,000 |

Example 4

The preferred embodiment of the present invention is as follows:

| | Oz. |
|---|---|
| Oronite dispersant | 364 |
| Petroleum ether | 364 |
| Sodium bicarbonate | 320 |
| Hydrochloric acid | 16 |
| Crude oil | 8 |
| Potassium permanganate | .28 |
| Water | 16,120 |

The compositions of Examples 1–4, when mixed, will make approximately 120–130 gallons of solution. Ten gallons of this solution is applied with approximately 3,000 gallons of water per acre with the subsequent result that the soil is made soft and pliable and more subject to irrigation. Accordingly, the utilization of soil conditioner of the present invention results in better penetration of moisture throughout the soil, better absorption of the water within the soil, and in better retention of water by the soil. The net result is the production of a much healthier crop wherever the present soil conditioner is utilized.

In the foregoing, the invention has been described only in connection with preferred embodiments thereof. Since many variations and modifications of the principles of the present invention within the scope of the description herein will readily occur to those skilled in the art, it is not intended to limit the invention to the exact disclosure, and accordingly all suitable modifications and equivalents may be resorted to within the scope of the invention as claimed.

What is claimed as new is as follows:

1. A liquid composition for admixture with the soil to promote plant growth which comprises 300–400 ounces of a water soluble non-ionic surface active agent, 300–400 ounces of petroleum ether, 275–350 ounces of sodium bicarbonate, 10–20 ounces of hydrochloric acid, .2–.35 ounce of potassium permanganate, 5–10 ounces of crude oil, and 14,000–18,000 ounces of water.

2. A liquid composition for admixture with the soil to promote plant growth which comprises 364 ounces of a water soluble non-ionic surface active agent, 364 ounces of petroleum ether, 320 ounces of sodium bicarbonate, 16 ounces of hydrochloric acid, .28 ounce of potassium permanganate, 8 ounces of crude oil, and 16,120 ounces of water.

3. A method for treating soil to increase its water absorption and retention properties which consists of admixing with the soil a composition comprising 300–400 ounces of a water soluble non-ionic surface active agent, 300–400 ounces of petroleum ether, 275–350 ounces of sodium bicarbonate, 10–20 ounces of hydrochloric acid, .2–.35 ounce of potassium permanganate, 5–10 ounces of crude oil, and 14,000–18,000 ounces of water.

4. A method of treating soil to increase its water absorption and retention properties which consists of admixing with the soil a composition consisting of 364 ounces of a water soluble non-ionic surface active agent, 364 ounces of petroleum ether, 320 ounces of sodium bicarbonate, 16 ounces of hydrochloric acid, .28 ounce of potassium permanganate, 8 ounces of crude oil, and 16,120 ounces of water.

References Cited in the file of this patent

UNITED STATES PATENTS

| | | |
|---|---|---|
| 2,558,772 | Moore | July 3, 1951 |
| 2,614,917 | Zukel et al. | Oct. 21, 1952 |
| 2,703,276 | Hedrick et al. | Mar. 1, 1955 |